United States Patent [19]

Watanabe et al.

[11] Patent Number: 4,724,962

[45] Date of Patent: Feb. 16, 1988

[54] DISK JACKET

[75] Inventors: Seizo Watanabe; Kazuyasu Motoyama; Youichi Hosaka, all of Hachioji, Japan

[73] Assignee: Olympus Optical Company Limited, Tokyo, Japan

[21] Appl. No.: 928,581

[22] Filed: Nov. 13, 1986

Related U.S. Application Data

[63] Continuation of Ser. No. 777,609, Sep. 19, 1985, abandoned.

[30] Foreign Application Priority Data

Sep. 20, 1984 [JP] Japan ................... 59-197722
Sep. 20, 1984 [JP] Japan ................... 59-197723

[51] Int. Cl.$^4$ ........................................... G11B 23/02
[52] U.S. Cl. ........................................ 206/444; 360/133; 360/97; 360/86
[58] Field of Search ................... 206/444; 360/133, 97, 360/86

[56] References Cited

U.S. PATENT DOCUMENTS

| | | | |
|---|---|---|---|
| 3,481,506 | 12/1969 | Vevirit et al. | 220/336 |
| 3,767,111 | 10/1973 | Pattengill | 220/336 |
| 4,511,944 | 4/1985 | Saito | 206/444 |
| 4,544,977 | 10/1985 | Ozawa et al. | 206/444 |

Primary Examiner—Joseph Man-Fu Moy
Attorney, Agent, or Firm—Bruce L. Adams; Van C. Wilks

[57] ABSTRACT

A disc jacket, especially for a photo-magnetic disk which records, reproduces and erases information, has a single opening configured to receive both a recording head and a central spindle. The opening extends along the whole radius of the disk to enable effective use of a larger area of the disc. The opening is opened and closed by a pair of shutter blades which automatically open when the disk jacket is inserted in an information recording and reproducing apparatus.

12 Claims, 10 Drawing Figures

DISK JACKET

This is a Rule 62 continuation application of application Ser. No. 777,609 filed Sept. 19, 1985 which claims priority of Japanese patent applications Nos. 197722/84 and 197723/84 both filed on Sept. 20, 1984.

BACKGROUND OF THE INVENTION

The present invention relates to a disk jacket receiving a photo-magnetic disk, or a disk-like medium and more particularly to an opening and closing mechanism of a recording and reproducing head insert opening of the jacket.

A conventional floppy disk, having a diameter of 3 or 3.5 inches, is protected from dust by a cover jacket. The jacket has a recording and regenerating or reproducing head insert opening, and the opening is closed by a cover to protect an information recording surface of the floppy disk from dust when the floppy disk is in an inoperative position.

Such a conventional disk jacket is shown in FIG. 9. The disk jacket 40 has a central spindle insert opening 41 and a head insert opening 42. A cover plate 43 made of a thin metal sheet has an opening 44 and is slidable on the jacket 40. Between the cover 43 and the jacket 40, a tension spring 45 is connected to maintain the cover 43 to a direction A shown in FIG. 9, to close the opening 42 of the jacket 40 in the inoperative position of the jacket 40. When the jacket 40 is set in a recording and regenerating apparatus, the cover plate 43 is pushed to a direction shown by an arrow B in FIG. 9, until the jacket opening 42 is aligned with the opening 44 of the cover plate 42 to allow inserting of the recording and regenerating head not shown.

When such a mechanism is utilized to a large recording and regenerating optical head of a photo disk apparatus a photo-magnetic disk apparatus, radial dimension of the jacket opening 44 must be increased to cover all information recording portion of the disk so that a width of the cover plate 43, in the radial direction of the disk, must be increased. Also, when the disk dimension is increased, the radial dimension of the cover plate must be increased.

In every case, the conventional cover plate having the cantilever support slide mechanism guided by a jacket edge portion can not be adapted to such increased dimension so that sliding of the cover plate can not be smoothly performed. Further, the opening 42 can not allow sufficient radially inward movement of the head, especially when the head is large.

SUMMARY OF THE INVENTION

An object of the present invention is to provide an improvement of the disk jacket to eliminate above mentioned disadvantages, in which the disk jacket has a sufficiently large opening to allow the head to move to a radially inner most portion of the disk, and also in which the disk has shutter means positively open and close the large opening.

Another object of the present invention is to provide the disk jacket having the shutter means which has disk retainer means for preventing the disk from rattling when the jacket is in an inoperative position.

To attain the above-mentioned objects, the disk jacket, according to the present invention, comprises one opening serving as the head insert opening and the central spindle opening.

The disk jacket also comprises two shutter blades relatively pivotable in the jacket so as to open and close the opening.

The shutter means has disk retainer means to retain the disk in an inoperative position.

DETAILED DESCRIPTION OF PREFERRED EMBODIMENT

Figure 1:
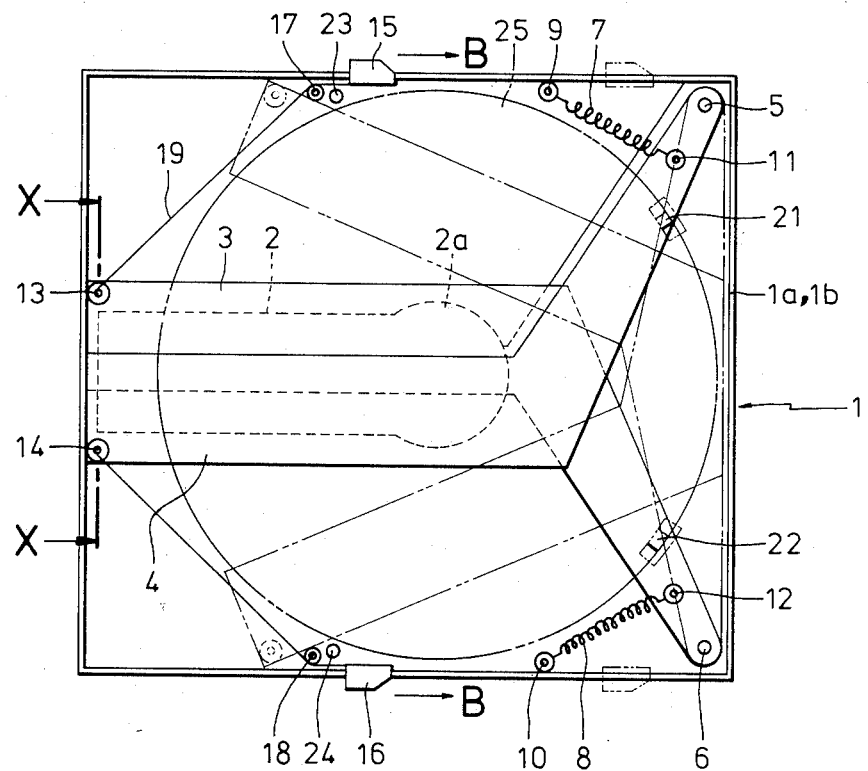
FIG. 1 is a plan view of the disk jacket, according to the present invention.

FIG. 1 shows a plan view of the disk jacket according to the present invention. 1 designates a jacket body which is formed by an upper generally rectangular jacket section 1a and a lower generally rectangular jacket section 1b as will be described later. According to the present invention, in the upper jacket 1a, an opening 2 to insert a recording and reproducing head is formed. The opening 2 communicates with an opening 2a to insert a spindle. Thus, the recording and reproducing head can be displaced from an outermost end to an innermost portion of the disk. The openings 2 and 2a are contiguous with one another and define a single, continuous opening having a central opening portion 2 and a radial opening portion 2a.

The opening 2 to insert the recording and reproducing head may be formed in one or both of the upper and lower jackets 1a and 1b, according to the device to be used. In the illustrated embodiment the openings 2 are formed in both jackets 1a and 1b. However, one opening may be communicated with the spindle opening 2a, according to the present invention, and the other opening may be similar to a conventional opening.

Figure 9:
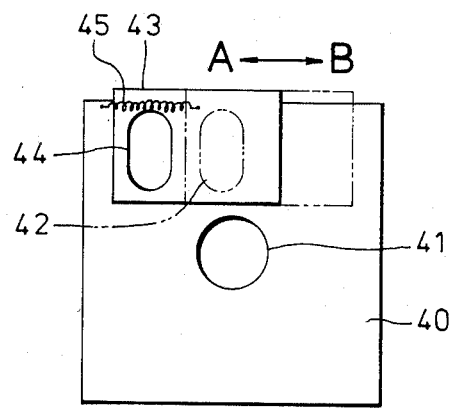
FIG. 9 is a diagramative plan view of a conventional disk jacket.

As the jacket opening 2 according to the present invention is very large compared with the conventional opening described in FIG. 9, shutter blades 3 and 4 are mounted to open and close the jacket opening 2, according to the present invention.

The shutter blades 3 and 4 comprise boomerang-shaped bent plates pivotably supported by shafts 5 and 6 which are secured with the jacket body 1 respectively. Fixed pins 9 and 10 secured with the jacket body 1 and fixed pins 11 and 12 secured with the shutter blades 3 and 4 respectively, are engaged by tension springs 7 and 8 respectively to urge the blades 3 and 4 in opposite directions to close the opening 2. Hooks 15 and 16 are slidable along side edges of the jacket body 1. As will be described later, when the jacket is set in a recording and reproducing apparatus, hooks 15 and 16 are engaged with means in the apparatus and are slideable along the side edges of the jacket 1 as shown by an arrow B in FIG. 1. Wires 19 and 20 are connected to the hooks 15 and 16, and extend through guide rollers 17 and 18 to blade retainers 13 and 14 which are connected to the blades 3 and 4 respectively. Thus, as the hooks 15 and 16 slide, the blades 3 and 4 are moved to open the opening 2 against the biasing force of the springs 7 and 8.

Disk stoppers 21 and 22 are secured to the shutter blades 3 and 4 and contact with the disk 25 when the blades 3 and 4 are in the closed position. Thus, when the disk 25 is not used, stoppers 21 and 22 urge the disk to stoppers 23 and 24 to prevent the disk 25 from moving.

Figure 2:
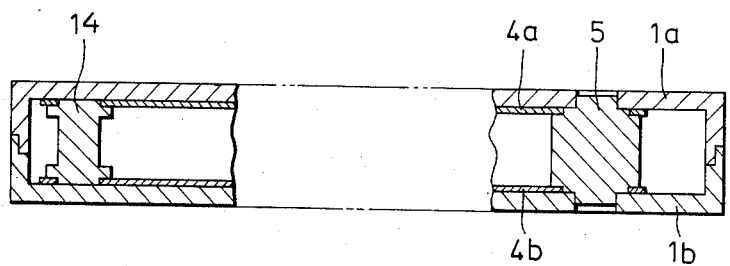
FIG. 2 and FIG. 3 are sectional views of the jacket of FIG. 1 showing double blades shutter.
Figure 3:
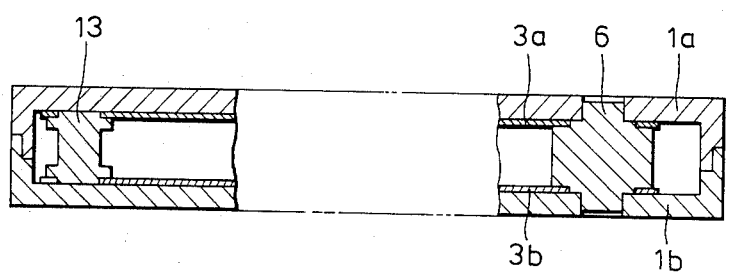

FIG. 2 shows a cross section of the shutter blades 4 along the pivot shaft 5 and the blade retainer 14 and FIG. 3 shows a cross section of the shutter blade 3 along the pivot shaft 6 and the blade retainer 13.

As shown, the shutter blades 3 and 4 are formed by pairs of double blades shutter made of blades 3a and 3b, and blades 4a and 4b respectively. The base portions of the blades 3a and 3b are secured with the pivot shaft 6 and end portions of the blades 3a and 3b are secured with the blade retainer 13. Similarly the base portions of the blades 4a and 4b are secured with the pivot shaft 5 and the end portions of the blades 4a and 4b are secured with the blade retainer 14. As described, the blade retainers 13 and 14 are connected to the wires 19 and 20 respectively which are connected to the hooks 15 and 16 so as to open the blades.

Figure 4:
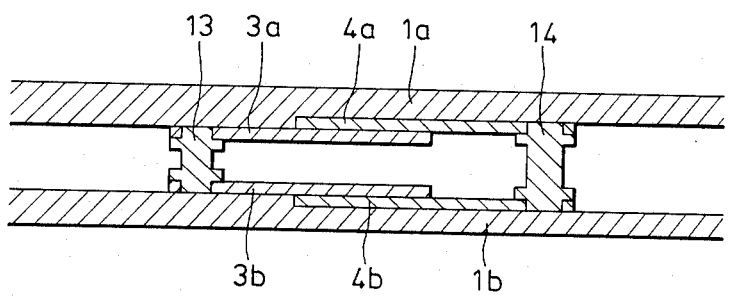
FIG. 4 is a sectional view along line X—X in FIG. 1.

The distance between the double blades of the blades 3 and 4 is shown in FIG. 4. As shown, the distance between the blades 4a and 4b is larger than the distance between the blades 3a and 3b. As the shutter blades 3a and 3b are fit between the blades 4a and 4b, and all the shutter blades slidably engage with inside surfaces of the jackets 1a and 1b, an effective sealing is achieved to keep the interior space of the jacket free from dust.

Figure 5:
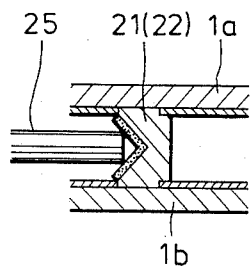
FIG. 5 is a sectional view showing a disk retainer mounted on the shutter blade shown in FIGS. 1 and 2.

The above mentioned disk stoppers 21 and 22 are shown in FIG. 5. The disk stoppers 21 and 22 maintain the distance between the double blades of the shutter blades 3 and 4. The stoppers 21 and 22 have V-shaped recess as shown. Soft retainer material such as felt is adhered on the V shaped recess so that the disk 25 is urged laterally to the stoppers 23 and 24 when the disk is in the inoperative position.

Figure 6:
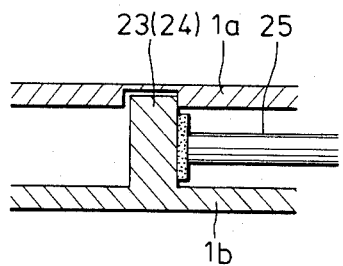
FIG. 6 is a sectional view showing disk stopper means cooperating with the disk retainer shown in FIG. 5, when the disk is in an inoperative position of the disk.

Disk stoppers 23 and 24 are formed, as shown in FIGS. 1 and 6, on the lower jacket 1b, and prevent the disk 25 from rattling. Soft elastomer is adhered on the stopper to contact with the disk 25 softly when the disk contact with the stoppers.

Figure 7B:
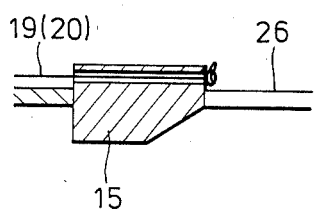
FIG. 7(b) is a partial plan view of FIG. 7(a)
Figure 7A:
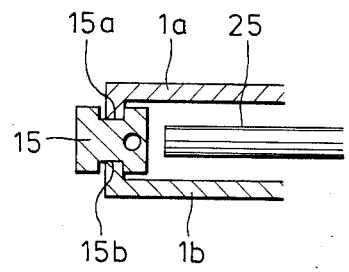
FIG. 7(a) is a sectional view showing a guidance of a hook by a jacket edge.

FIGS. 7(a) and 7(b) show the slide mechanism of the hooks 15 and 16. As shown, upper and lower recesses 15a and 15b on the hook 15 engage with guide rail means 26 formed between the upper and lower jackets 1a and 1b.

Operation of the disk jacket will be described.

Figure 8:
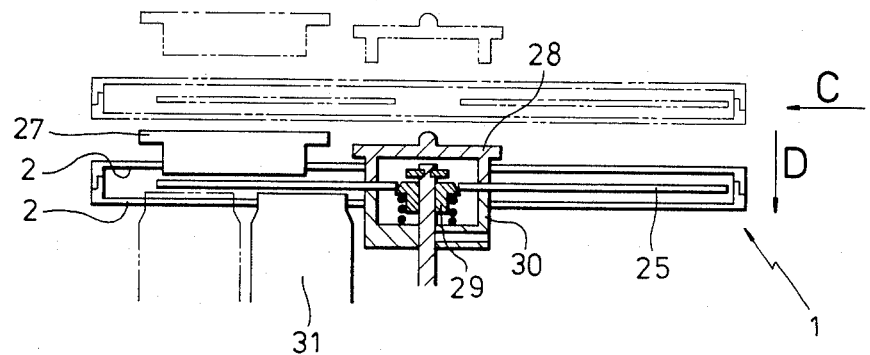
FIG. 8 is an illustration showing inserting of the disk jacket shown in FIG. 1 to a recording and reproducing apparatus.

At first a disk 25 in the jacket 1 is introduced into a drive mechanism of a recording and reproducing apparatus into a phantom line position shown in FIG. 8 in a direction as shown by an arrow C in FIG. 8. The inserting position is determined such that the jacket 1 is not disturbed by a disk spindle. As the jacket 1 is inserted, the hooks 15 and 16 engage with engage means in the apparatus so that relative movement between the hooks and the jacket 1 causes pulling of the wires 19 and 20 to open the shutters 3 and 4. Then the jacket 1 is lowered as shown by an arrow D in FIG. 8, into a disk spindle portion of the apparatus. The rotation center of the disk 25 is determined by a disk guide 29, and the disk 25 is retained between a disk receiver 30 and a disk retainer 28 so that the disk 25 is accurately positioned in the apparatus. An auxiliary magnet 27 is inserted in the opening 2 and is positioned accurately to absorb vertical clearance of the disk 25.

Then, a head 31 is inserted in the lower opening 2 of the jacket 1 to record and reproduce desired information corresponding to a desired position in the disk 25.

It will be appreciated that, according to the present invention, the disk jacket has one opening which serves as a recording and reproducing head insert opening and a spindle insert opening so that the jacket can be used for an apparatus having a large head such as an photo disk or photo magnetic disk apparatus to allow free displacement of the head to the innermost portion of the disk. Thus, the recording and reproducing area of the disk can be fully utilized and information quantity recorded on the disk is also increased.

Further, the shutter blades of the jacket, according to the present invention, are relatively pivotted to open or close the opening of the jacket. Compared with the conventional slidable shutter, the large opening of the jacket can be easily and positively closed. Also, when in the inoperative position, the disk in the jacket is retained by cooperation of the stopper in the jacket with the disk retainer mounted on the shutter blade so that the disk is held in position without rattling and without undesired damage.

As the shutter blades are similar to each other, and as only a few component parts are necessary to produce the shutter assembly, the jacket according to the invention can be manufactured at low cost.

We claim:

1. A disk jacket for receiving a photo disk which is rotated by a spindle, and which records, reproduces and erases information stored thereon by means of an optical head, the disk jacket comprising: a pair of disk jacket section disposed in opposed facing relation from each other for receiving therebetween a photo disk; and means defining a single opening in at least one of the jacket sections and extending along a radius of the photo disk, the single opening being configured to receive a spindle therein to rotatably support the photo disk and to receive the optical head therein so as to enable movement of the optical head along the radius of the photo disk from the radially outermost end thereof to the radially innermost portion thereof.

2. A disk jacket for receiving a disk-like medium which records, reproduces and erases information on tracks thereof by means of a head, the disk jacket comprising: a pair of disk jacket sections disposed in opposed facing relation from each other for receiving therebetween a disk-like medium; and means defining an opening in at least one of the disk jacket sections and extending in a radial direction with respect to the disk-like medium, the opening having a central portion disposed in the vicinity of the center of the one disk jacket section and configured to receive therein a spindle for rotatably supporting the disk-line medium, and a radial portion contiguous with the central portion and extending outwardly therefrom in the radial direction and configured to receive therein the head to thereby enable the head to undergo movement in the radial direction between the radial innermost and outermost tracks of the disk-like medium.

3. A disk jacket according to claim 2; wherein the radial portion of the opening is dimensioned to receive a head of a photo disk apparatus.

4. A disk jacket according to claim 2; wherein the radial portion of the opening is dimensioned to receive a head of a photo-magnetic disk apparatus.

5. A disk jacket for receiving a disk-like medium which records, reproduces and erases information stored thereon by means of a head, the disk jacket comprising: a pair of generally rectangular disk jacket sections disposed in opposed facing relation from each other for receiving therebetween a disk-like medium; means defining a single opening in at least one of the generally rectangular jacket sections and extending along a center line of the one rectangular jacket section parallel to a side line thereof, the single opening being configured to receive the head therein so as to enable movement of the head along a radius of the disk-like medium; and a pair of shutter blades disposed between the pair of generally rectangular jacket sections and pivotably supported at opposite corners thereof relative to the center line for cooperatively opening and closing the single opening.

6. A disk jacket according to claim 5; including a pair of springs each engaged between the jacket sections and one of the shutter blades for urging the shutter blades to close the single opening; and opening means connected to each of the shutter blades for moving each of the shutter blades to an opposite side with respect to the center line so as to open the single opening.

7. A disk jacket according to claim 5; in which each of the shutter blades comprises a boomerang-shaped bent plate.

8. A disk jacket according to claim 5; in which the single opening is configured to receive a spindle therein to contact with and rotatably support the disk-like medium.

9. A disk jacket according to claim 5; wherein each of the jacket sections has a single opening therein.

10. A disk jacket according to claim 9; in which each of the pair of shutter blades comprises a set of double blades for coincidently closing both of the single openings.

11. A disk jacket according to claim 7; including a disk retainer for retaining the disk-like medium when the shutter blades close the single opening.

12. A disk jacket according to claim 6; wherein the opening means includes means operable in response to inserting and removing movements of the disk jacket relative to an information recording and reproducing apparatus for effecting opening of the shutter blades.

* * * * *